United States Patent Office 3,418,406
Patented Dec. 24, 1968

3,418,406
PROCESS FOR PREPARING BIAXIALLY ORIENTED
ACRYLONITRILE POLYMER FILM
Lawrence E. Ball, Akron, Ohio, assignor to The Standard
Oil Company, Cleveland, Ohio, a corporation of Ohio
No Drawing. Filed Dec. 28, 1964, Ser. No. 421,612
5 Claims. (Cl. 264—206)

ABSTRACT OF THE DISCLOSURE

Biaxially oriented film of an acrylonitrile polymer is prepared by solvent casting of film and subsequent two-way stretching and heat setting of the solvent-containing cast film.

---

This invention relates to oriented films and other shaped articles of polymers of alpha, beta-olefinically unsaturated nitrile monomers and more particularly pertains to biaxially oriented films of certain nitrile polymers and to a process for preparing said films.

The film-forming nitrile polymers most useful in the prsent invention are those composed primarily or wholly of an alpha, beta-olefinically unsaturated nitrile monomer component such as acrylonitrile.

Previously described polyacrylonitrile has been reported as fibrillating severely during uniaxial orientation. The term "fibrillation" is used in the textile industry to indicate a type of fiber disintegration or longitudinal fracture generally along the lines of molecular orientation. As a consequence of fibrillation, the fiber or filament is longitudinally divided into segments or fibrils as has ben pointed out in U.S. Patent No. 2,139,273. The fibrillation problem is quite acute in film manufacture, it heretofore has been said to be virtually impossible to orient biaxially polyacrylonitrile. This problem has been referred to in some detail in British Patent No. 887,008, for instance, wherein the statement is made that "attempts to biaxially orient polyacrylonitrile films by the known techniques, and thus utilize in film form the potentially advantageous properties of acrylonitrile polymers, have met with failure" and "the difficulty in stretching polyacrylonitrile films in two mutually perpendicular directions arises because the polymer chains tend to pack into fibrils. Hence, the film readily stretches in one direction to form a film having a fibrillar structure and it fibrillates when attempts are made to stretch the film in a direction perpendicular to the first direction of stretch." This British patent describes a method for avoiding the fibrillation problem and preparing an oriented film of polyacrylonitrile by employing the "coalesced film" technique.

Contrary to what has previously been known in the prior art, I have discovered that useful oriented films of certain nitrile polymers having outstanding physical and chemical properties can be prepared by employing polymer falling within certain molecular weight or viscosity ranges and by employing certain solvents and manipulative techniques hereinafter more fully described.

I have now discovered that useful oriented films and other oriented articles having outstanding physical and chemical properties can be prepared from a polymer of an alpha, beta-olefinically unsaturated nitrile, such as acrylonitrile, by employing a solution of a polymer having a minimum apparent molecular weight as determined by viscosity measurement of about 70,000, forming a film from a solution of the acrylonitrile polymer in a suitable solvent hereinafter more fully descaribed, retaining some or virtually all of the solvent in said film, stretching it in a longitudinal direction, stretching the film in a transverse direction (substantially at right angles to the longitudinal stretch direction) and at the same time removing at least some of the solvent therefrom, heat setting (i.e., maintaining the film in a biaxially stretched condition while heating) the film and removing substantially all of the remaining solvent therefrom.

My process is to be distinguished from the so-called "coalesced film" techniques of the prior art in that I use solutions of polymer rather than dispersions of polymer in the formation of my films and my process does not necessitate washing or leaching steps to remove salts, solvents and the like because there are essentially no extraneous non-volatile materials present in my film-forming solutions. By the term "solution" as used herein is meant a single phase mixture of polymer and solvent and all of the solvent present in the solution functions to solvate the polymer present. The intermediate solvent-containing unoriented films produced in my process do not contain large pores or voids as do the previously described unoriented "coalesced films." The vapor and gas barrier properties of my intermediate unoriented film when it is dried are excellent. There is very little difference in the density of my films either in the biaxially oriented or unoriented state, which fact further distinguishes my films from those prepared by the prior art "coalesced film" process.

It is an object of the present invention, therefore, to provide novel biaxially oriented nitrile polymer films which have excellent physical properties, excellent chemical resistance, and are excellent barriers for most vapors and gases. It is also an object to provide a method for the production of these novel biaxially oriented films. That the foregoing and other objects have been accomplished will become apparent to those skilled in the art from the following description and illustrative examples.

The polymers most useful in the present invention are those resulting from the polymerization of at least one alpha, beta-monoolefinically unsaturated nitrile monomer having from 3 to 4 carbon atoms and a terminal $CH_2=C<$ group. It is also contemplated to be within the scope of the present invention to replace from about 5 to 15% by weight of the alpha, beta-monoolefinically unsaturated nitrile in the polymers embodied herein with one or more polymerizable monoalkenyl monomers copolymerizable therewith such as those known in the art for imparting dyeability to acrylonitrile fiber polymers. Polymerizable monoalkenyl monomers useful in this invention include the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; the methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate, and the like; the vinyl aromatics such as styrene, alpha-methyl styrene, vinyl toluene, the vinyl xylenes, the vinyl naphthalenes, isopropenyl benzene, and the like; vinyl amides such as acrylamide, methacrylamide, N-methyl acrylamide, vinyl benzamide, N-vinyl pyrrolidone, and the like; the vinyl halides such as vinyl chloride, vinyl bromide, vinyl fluoride, vinylidene chloride, vinylidene fluoride, dichloro difluoro ethylene, tetrafluoroethylene, and the like; olefins such as ethylene, propylene, isobutylene, butene-1, and the like. More preferred in this invention are polymers composed only of at least one alpha, beta-monoolefinically unsaturated nitrile.

The alpha, beta-monoolefinically unsaturated nitrile monomers useful herein include acrylonitrile, methacrylonitrile, alpha-chloroacrylonitrile, crotononitrile, vinylidene cyanide, cinnamonitrile, atroponitrile and the like. The preferred nitrile monomers are acrylonitrile and methacrylonitrile and most preferred in the present invention is acrylonitrile.

The film-forming polymers useful herein may be prepared in any convenient manner, such as by batch, bulk, solution, emulsion, or suspension polymerization techniques, all of which are well known in the art. For best results, however, it is preferred that the polymers be prepared in an aqueous medium in the presence of a so-called redox catalyst composed of a water soluble peroxygen compound and an oxidizable sulfur compound as promoter, as more fully described in U.S. Patent No. 2,486,241. The polymerization reaction may be carried out by adding all of the monomer to the reaction mixture at once or in increments or in a continuous manner during the course of the reaction. A suitable emulsifier, surface active agent, or dispersing agent may be used throughout the polymerization procedure in the preparation of the film-forming polymers of this invention.

In a representative polymerization procedure, which is not meant to limit the scope of this invention, an aqueous medium containing about 0.1 to 2% of a perdisulfate salt, about 0.05 to 0.5% of a polymerization adjuvant such as sodium bisulfite, and about 0.15 to 5% of a suitable emulsifier or dispersing agent and the monomer is placed in an appropriate vessel which is provided with a means of agitation, such as stirring or shaking. The air in the free space of the vessel is displaced by an inert gas such as nitrogen. The mixture is, thereafter, heated to a temperature in the range of 30 to 100° C. with continuous or intermittent agitation until polymerization has proceeded to the desired extent (usually 70–100% conversion).

At the conclusion of the polymerization, the polymers useful in this invention may be isolated as finely divided powders by a variety of methods. For example, the dispersion may be sprayed into a heated and/or evacuated chamber whereby the water is removed as vapor and the polymer falls to the bottom of the chamber. When the polymer is prepared in sufficiently high solids, i.e., 15% or higher, it often can be isolated as a fine granular powder simply by filtration or centrifugation. The polymer may also be isolated by cooling the dispersion below the freezing point of the aqueous medium or by the addition of a large volume of a lower aliphatic alcohol such as methanol or ethanol. A satisfactory procedure consists in adding an appropriate amount of an electrolyte solution to the diluted aqueous dispersion with rapid agitation at a temperature just below the point at which the precipitated particles tend to adhere. This procedure yields a polymer in the form of dense, granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride and aluminum sulfate. After precipitation of the polymer, it is filtered and washed repeatedly with water to remove traces of electrolyte and dispersing agent which may adhere to the particles. Washing with dilute solutions of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol, such as methanol or ethanol.

Because polyacrylonitrile has a very high softening temperature coupled with a serious thermal degradation problem, preparation of film therefrom would appear to be possible only through some form of solvent or dispersion process such as extruding or casting. Polymer solutions suitable for casting or otherwise forming films may be prepared by dissolving from about 10 to 75% by weight of the polymers in one or a combination of volatile polar organic solvents such as dimethyl formamide, dimethyl thioformamide, N-methyl-beta-cyano-ethyl formamide, alpha-cyano acetamide, N-methyl pyrrolidone, gamma-butyrolactone, ethylene carbonate, tetramethyl oxamide, epsilon-cyanolactone, 1,3,3,5-tetracyanopentane, dimethyl cyanamide, dimethyl methoxy acetamide, N-formyl morpholine, N-formyl hexamethylene imine, dimethyl sulfoxide, propiolactone, N,N-dimethyl acetamide, dimethyl sulfone, tetramethylene cyclic sulfone, ethylene cyanohydrin, nitromethane, acetonitrile, malononitrile, tris-dimethylaminophosphine oxide, N,N'-tetramethylmethane phosphonamide, etc., to form a solution.

Well-known or special techniques for dissolution of the polymer in a solvent or mixture of solvents may be employed.

If desirable, lubricants, dyes, bleaching agents, plasticizers or pseudo plasticizers, pigments and antistatic agents may be incorporated into the polymer solution of this invention or the final films or shaped articles prepared therefrom may be after-treated with agents of these types.

Stabilizers of various types may be included in the films of this invention. Useful stabilizers include the phosphorous-containing polyphenolic compounds more fully disclosed in U.S. Patent No. 2,931,696; the polyphenolic alkane compounds more fully disclosed in U.S. Patent No. 2,931,697; hydrofluoboric acid and water soluble salts thereof as more fully disclosed in U.S. Patent No. 2,846,423; ethylene diamine tetraacetic acid and similar compounds as more fully disclosed in U.S. Patent No. 3,003,993; manganese salts as more fully disclosed in U.S. Patent No. 2,661,346; certain amine salts as more fully disclosed in U.S. Patent No. 2,835,647; and the adjuvants more fully disclosed in U.S. Patent No. 2,748,097.

Films can be cast or otherwise deposited from solutions of the polymers embodied herein by sheet-casting or extrusion techniques which involve depositing a relatively thin film of the solution usually on a substantially flat, sometimes smooth surface and sometimes involves removing some of the solvent from the deposited film by volatilization. The surface upon which the film is deposited may be any surface which does not readily adhere to the film, such as glass, metals, ceramics, polymers or coated paper. Metail foils such as stainless steel or aluminum are preferred as the casting surface. Films resulting from this procedure are flexible and of excellent physical properties and may be oriented readily without fibrillation by stretching in one or preferably two mutually perpendicular directions.

In the preparation of films from solutions of the polymers of the present invention, a high-production, commercial solvent-casting machine resembling a Fourdrinier paper machine in general layout may be used. Viscous solutions of the polymer or melts of polymer and small amounts of solvent may also be extruded from a film die by known means.

The polymer solution can then be distributed or deposited onto a moving, endless, flexible, polished stainless steel belt which may be heated. Some of the solvent may be removed by evaporation if necessary and a sheet still containing solvent is run from the belt around heated drums to complete the drying. The use of a heated dope of higher polymer concentrations in casting will speed up the casting process and produce a thicker film. In the laboratory a large variable temperature electric hot plate and polished stainless steel plate may be used in the preparation of the film. The polymer solution is evenly distributed on the stainless steel plate with a spreader and part of the solvent is removed at a selected temperature. Drying may be completed in an oven.

In the present process the solvent-containing film is stretched at a selected temperature, usually in a gaseous atmosphre such as air or nitrogen, in two mutually perpendicular directions simultaneously or sequentially to form an oriented film still containing volatile material. Heat setting or final drying of the film accompanied by removal of all or most of the volatile material remaining in the film is then carried out while the film is maintained in a dimensionally fixed condition so that little or no dimensional change in the plane of the film occurs during this drying step. The dried film is then cooled, preferably before releasing it from its dimensionally fixed condition so as to avoid usually undesirable dimensional change.

In the preferred process of the present invention the unoriented film containing from 8 to 70% by weight of solvent and preferably from 25 to 45% by weight solvent which may be prepared by solvent casting or extrusion through a film die optionally followed by partial removal of the solvent by volatilization, is passed continuously to a drafter or similar device for accomplishing a longitudinal stretching. The drafter may be a conventional four-roll apparatus having two hot rolls and two cold rolls. For instance, the film may conveniently be drawn in the machine direction by passing it between or around a pair or series of slow rolls, which may be heated to the desired drawing temperature and then between or around a pair or series of fast rolls, the two pairs or series of rolls being closely spaced so that the film is supported on the rolls over most of the region in which it is subjected to tension, and transverse shrinking is reduced to a minimum. A useful alternative method of heating the film is by means of radiant heat applied to a small length of film, in the desired drawing region, as is consistent with the need to heat the film to the desired drawing temperature. In the drafting operation it is desirable to employ temperatures of from about 100 to 260° F. and preferably from about 135 to 220° F. on the hot rolls and the cold rolls preferably are maintained at or near room temperature. The stretch ratio of the film employed in the drafting operation should be from 1.2:1 to 10:1 stretched length-to-original length and preferably from about 2:1 to 4:1. The stretch rate is not critical but in commercial operation it is usually above 1,000%/min. and no greater than about 200,000%/min. Some of the solvent is usually removed from the film in the drafting operation. The film, still containing most of the solvent it contained on entering the drafter, next is fed continuously into a tenter or similar apparatus where transverse stretching is carried out. One type of apparatus for drawing the film in the transverse direction comprises a tenter frame on a pair of revolving, angularly designed ground discs that are adapted to coact with opposite margins of the film, each margin being held in the groove of the disc by means of an endless belt. Another tenter is made up of two parallel chains which run in adjustable tracks and run in a horizontal plane. The width of the chains is governed by the distance between the adjustable tracks. The film is gripped by the chains and stretched in substantially right angles to the length or the direction of travel of the film. The tenter is contained in an enclosure which can be heated to any desired temperature. It is also often desirable to have a preheat zone in which the film is brought up to tentering temperature before the actual transverse stretching of the film begins. On the order of about half of the solvent originally present in the film as it entered the drafter is removed during the tentering operation. The tentering operation is usually carried out at temperatures in the range of from about 100 to about 260° F. and preferably from about 160 to 210° F. The ratio of stretching in the tentering operation is about the same as that described in the drafting operation or just a little less. In other words, it is preferred that the degree of stretching of the film in the longitudinal direction by drafting be about the same or a little greater than the degree of stretching in the lateral direction by tentering. The drafting and tentering operations can be carried out simultaneously in suitable apparatus at a temperature of from about 100 to 260° F. and at the end of the operation the film still retains at least about half the solvent originally present before this operation started. The film is next heat set or finally dried which comprises maintaining it in a fixed position relative to the plane of the film so that it cannot retract either laterally or longitudinally and heating it at from about 125 to 250° C. for from a fraction of a second up to about five minutes. The length of time for this operation will depend to a large degree upon the particular temperature employed. For the higher heat setting temperatures, shorter periods of time are required. It is to be understood that the film after tentering can be relaxed somewhat before heat setting if it be so desired. Finally, the film is cooled to about room temperature and rolled up or cut up in various lengths and shapes, etc., depending upon the particular end use requirement. If the film is released from the tentering apparatus just after heat setting but before cooling, it will shrink to some extent during the cooling period and generally this shrinkage is undesirable and should be avoided. It is generally most desirable and most convenient to cool the film at least to below 120° C. after the heat setting treatment but before it is reelased from the tentering chains. Substantially all of the residual solvent is removed from the film during the heat setting or final drying operation so that the final cooled film will not contain any more than 10% and preferably no more than 5% by weight of residual solvent and more preferably the final film should be substantially free of residual solvent.

The oriented films embodied in the present invention are outstanding film barriers for various gases, vapors and the like and in this respect they resemble metal foils more than they resemble plastic films of the types which are presently available. The oriented films of this invention also have excellent resistance to attack by most chemicals, they have excellent dimensional stability, excellent resistance to degradation by utraviolet radiation, they have good electrical properties and excellent mechanical strength including high tensile strength, high tensile modulus and excellent abrasion resistance. The foregoing and other desirable properties make the films of this invention particularly useful in a wide variety of applications such as magnetic tape, surfacing and laminating, packaging, electrical insulating tape, pressure sensitive tapes, glazing and the like. The films of this invention can be laminated to plywood, wood, fiberglass panels, aluminum or other metals, paperboard or similar materials. Many of such laminated structures, as well as the film itself, are satisfactory for both indoor and outdoor use. The films and laminates may be metallized and end uses of a specific nature for laminates include chairs, bench tops, doors, radiant heating panels, thermal insulation, house siding and roofing, curtain wall panels, signs, vending machines, baseboard trim, cabinets, appliances, flooring, awnings, baby carriages, tarpaulins, reflector signs, vehicle trim, dry battery covers, wallpaper, and fuel cells. Metallized film can be cut into fine strips and made into metallized yarn of varying colors. The films themselves can be cut into fibers and used to make yarns, felts and non-woven fabrics of various types. It should be stressed that the ultimate film properties can be tailored within certain limits through slight variation in the orienting and heat setting conditions. As a packaging or barrier film, this high stretch ratio (on the order of 8:1 total areal draw) biaxially oriented film is highly desirable. However, even at a total areal draw of 3:1, a very low water vapor transmission is obtained. For use in a laminating package such a film of lower tensile strength is satisfactory. Unbalanced orientation film of this invention has been prepared for tape use. Some of this material has been coated with magnetic iron oxide dopes and the resulting products have shown promise as sound recording and computer recording tape. Similar applications include photographic and cinematographic film base, video tapes, packaging tapes, adhesive tapes, conveyor belts, electrical tapes, typewriter ribbons, tapes for capacitor and transformer winding and the like. A moderate amount of transverse orientation is desirable even in tape applications in order to avoid uniaxial splitting which often occurs in uniaxially oriented film.

In general, typical films prepared by the process of this invention will have the following properties:

| | |
|---|---|
| Area to factor in.²/mil./lb. | 24,000. |
| Tensile strength: | |
|     Longitudinal direction | 13–25,000 p.s.i. |
|     Transverse direction | 13–25,000 p.s.i. |
| Elongation, percent: | |
|     Longitudinal direction | 20–90. |
|     Transverse direction | 20–90. |
| Tensile modulus, p.s.i.$\times 10^5$ | 5.0–6. |
| Drop rod failure, height inches | 18–25. |
| Tear resistance, g./ml. Elmendorf (initiated) | 23–64. |
| Tensile heat distortion | 50 p.s.i. at 250° C. |
| Resistance to heat, ° C. | Chars at 250° C. |
| Dimensional stability: | |
|     212° F. | –0.5%. |
|     250° F. | –2.5%. |
| Dielectric strength, volts/mil. | 4,000. |
| Dielectric constant | 3. |
| Dissipation factor | 0.025. |
| Abrasion resistance, A.S.T.M. D 968, percent gloss retention | 81. |
| Water absorption, 24 hrs., 25° C. percent | 0.8. |
| Sunlight resistance, hours exposure to S–1 sunlamp without change | 624. |
| Solvent and chemical resistance, A.S.T.M. D 1239–55, percent weight increase: | |
|     Distilled water | 0.00. |
|     1% soap solution | 0.00. |
|     Cotton seed oil | 0.00. |
|     Mineral oil | 0.00. |
|     Kerosene | 0.00. |
|     50% ethyl alcohol | 0.00. |
|     10% $NH_4OH$ | 0.00. |
|     10% HCl | 0.00. |
|     10% NaOH | 0.00. |

In most uses for film the film thickness in the range of 0.1 to 1 or 1.5 mils is generally most desirable. In laminating applications, film thicknesses of 1, 1.5, 2 and even as high as 3 mils may be employed.

It is to be understood that those skilled in the art can make various modifications and changes in the compositions and processes described herein without departing from the scope of this invention.

In the following illustrative examples, the amounts of ingredients are expressed in parts by weight unless otherwise indicated.

Example I

Acrylonitrile was homopolymerized in aqueous emulsion with a redox initiator and a mercaptan modifier for molecular weight control. The following ingredients were placed in a three liter, three neck, round bottom flask equipped with stirrer, thermometer, nitrogen inlet and reflux condenser.

| Material | Parts | Grams |
|---|---|---|
| Water (deoxygenated and purged with nitrogen) | 400 | 1,500 |
| Acrylonitrile (free of inhibitor) | 100 | 375 |
| Emulsifier (GAFAC RE 610[1]) | 3.5 | 13.1 |
| Modifier (t-dodecyl mercaptan) | 0.35 | 1.17 |
| $(NH_4)_2S_2O_8$ | 0.50 | 1.88 |
| $Na_2S_3O_5$ | 0.23 | 0.86 |

[1] A mixture of R—O—$(CH_2CH_2O)_n$—$PO_3M_2$ and [R—O—$(CH_2CH_2O)_n$]$_2PO_2M$ wherein $n$ is a number of from 1 to 40, R is an alkyl or alkaryl group and preferably a nonyl phenyl group and M is hydrogen, ammonia or an alkali metal which composition is sold by the General Aniline and Film Corp.

The polymerization reaction was carried out at 50° C. for a period of 5½ hours with continuous stirring and in a nitrogen atmosphere. Polyacrylonitrile was recovered by coagulation with aluminum sulfate solution and washing with water to remove residual emulsifier. A yield of 341 grams (91% of theory) of polyacrylonitrile was obtained. The molecular weight as determined by dilute solution intrinsic viscosity using the equation of Krigbaum and Kotlair, Journal of Polymer Science, 32, 323 (1958), was found to be 152,000.

50 grams of the powdery polyacrylonitrile product from above was dissolved in 300 grams of a 90:10 by weight mixture of dimethyl formamide and ethylene carbonate, respectively, to give a viscous dope containing 14.3% by weight of polymer. This dope was passed through a coarse glass frit filter and the filtrate was used to cast a film onto a flat glass plate by means of a 50 mil doctor blade. The cast dope was then dried partially to a solvent containing film in about 1 hour at 62° C.

The foregoing film containing about 31 to 50% solvent was then oriented biaxially on a film orientor which was a machine operated pantograph equipped with clips to prevent the film from "necking in" during extension of the pantograph. The heat supplied during the orientation was supplied by a 1500 watt radiant heater mounted about three inches above the pantograph (60–95° C.). The speed of orientation was governed by a speed changer on a ½ horsepower electric motor connected through a gear system to the pantograph frame. The speed setting on the orientor speed changer was 1500 (180 in./min.), the voltage applied to the radiant heater was 150 volts and time in seconds of heating prior to start of orientation of stretching was varied. The films were oriented biaxially in separate steps by orientation first in the "primary" direction and then by turning the film and orienting it under substantially the same conditions in the "secondary" direction which was the direction substantially 90° to the primary direction. After the second orientation the film was dried for a time while under tension under the radiant heater. The results are given in the following table:

HEATING TIME (60–95° C.) PRIOR TO ORIENTATION, SECONDS

| Film sample | Primary direction | Secondary direction | Final drying time, min. |
|---|---|---|---|
| A | 25 | 12 | 10 |
| B | 25 | 12 | 15 |

Residual solvent in the films of 11.4 to 24.6% was found after orientation and drying.

A "heat set" step was next employed on the films described above. The films were retained in a metal frame to prevent relaxation in either the oriented directions and the retained film was dried in a forced air oven at 200° C. for one minute. The tensile properties (ASTM D882–61T) for the heat set films described above which contained 4.4 to 9.3% residual solvent are given below:

TENSILE STRENGTH
[$10^{-3}$ p.s.i.]

| Film sample | Primary direction | Secondary direction | Percent elongation | |
|---|---|---|---|---|
| | | | Primary | Secondary |
| A | 14.06 | 16.34 | 108 | 56.5 |
| B | 15.52 | 14.6 | 75.4 | 81.7 |

Similar results were obtained when the initial film was deposited by extruding the solution from a film die onto a smooth surface.

Results similar to the foregoing were obtained when methacrylonitrile and acrylonitrile-methacrylonitrile copolymers were employed in place of the polyacrylonitrile described.

Example II

The following polymers were prepared in an emulsion polymerization procedure similar to that more fully described in Example I. In this procedure the amount of t-dodecyl mercaptan was varied so as to produce a variation in the molecular weight of the polymers produced. The resulting polymers were dissolved in dimethyl formamide to form 15% by weight solutions of polymer and the bulk viscosities (in Stokes) of these solutions were determined at 24° C. A film was also cast from each of the foregoing solutions (0.015 mil wet thickness) as described in Example I. The unoriented films were dried and tensile properties were determined:

| Polymer | Parts t-dodecyl mercaptan | Molecular wt. from intrinsic viscosity | Stokes bulk viscosity | Film properties | |
|---|---|---|---|---|---|
| | | | | Tensile strength $\times 10^{-3}$ | Percent elongation |
| A | 0 | 481,000 | | 9.08 | 7.65 |
| B | 0.35 | 152,000 | 245 | 8.60 | 6.3 |
| C | 0.45 | 123,000 | 95.0 | 9.63 | 7.98 |
| D | 0.8 | 95,500 | 39.7 | 8.79 | 6.28 |
| E | 0.9 | 78,000 | 10.5 | 3.15 | 1.45 |
| F | 1.10 | 66,000 | 7.5 | 5.33 | 5.0 |
| G | 1.30 | 59,000 | 5.0 | 6.63 | 4.0 |

Polymer E above was found to have a water vapor transmission (WVTR) of 0.068 gms./100 in.$^2$/atm./24 hrs./mil.

Similarly, sheets of the foregoing polymers were cast from a 90/10 mixture of dimethyl formamide/ethylene carbonate, biaxially oriented and heat set essentially as described in Example I. The final films had the following properties:

| Polymer | Average draw ratio | | Tensile strength $\times 10^{-3}$ | | Percent elongation | |
|---|---|---|---|---|---|---|
| | Primary | Secondary | Primary | Secondary | Primary | Secondary |
| A | Not determined | | 18.47 | 19.2 | 57.6 | 38.6 |
| B | 3.2 | 2.2 | 19.44 | 15.8 | 89.7 | 37.2 |
| C | 2.95 | 2.86 | 15.23 | 16.02 | 47.2 | 35.2 |
| D | 2.63 | 2.8 | 17.6 | 18.30 | 44.8 | 36.8 |
| E | 2.74 | 2.74 | 13.8 | 17.5 | 21.3 | 20.7 |
| F | 2.37 | 2.50 | 8.5 | 10.5 | 16.0 | 20.2 |
| G | 1.9 | 2.4 | 8.6 | 10.9 | 10.9 | 7.07 |

Although polymers F and G formed unoriented solvent-containing films which were somewhat comparable in properties to those for polymers A–E, it is apparent that these two polymers are outside the scope of the instant invention because they were biaxially oriented with great difficulty because of fibrillation and embrittlement which occurred in the uniaxially oriented film. Moreover, the physical properties, particularly tensile strength, of the biaxially oriented film from polymers F and G are only comparable to the physical properties of the unoriented films for polymers A–D. The biaxially oriented films for polymers within the scope of this invention (A–E) displayed tensile strengths which were on the order of twice that of the biaxially oriented films for the polymers outside the scope of this invention (F and G).

Example III

Polyacrylonitrile samples for film preparation were prepared by blending various polyacrylonitriles of varying molecular weights as described in Example I. The procedures used are more fully described in Examples I and II. The unoriented films prepared from these various blends were found to have the following properties:

| Blend | Component Molecular weight | | Parts/100 of Component | | $\lambda s$ | Apparent molecular weight | Film tensile $\times 10^{-3}$, p.s.i. | Elongation |
|---|---|---|---|---|---|---|---|---|
| | 1 | 2 | 1 | 2 | | | | |
| A | 96,000 | 481,000 | 80 | 20 | 100 | 115,000 | 9.03 | 10.40 |
| B | 52,000 | 152,000 | 50 | 50 | 43 | 96,000 | 7.86 | 5.40 |
| C | 52,000 | 152,000 | 70 | 30 | 16.5 | 74,000 | 7.26 | 3.25 |

Biaxially oriented and heat set films corresponding to those above were prepared according to the procedure of Example I and they were found to have the following properties:

| Blend | Draw ratio | | Tensile strength $\times 10^{-3}$, p.s.i. | | Percent elongation | | Samples tested |
|---|---|---|---|---|---|---|---|
| | Primary | Secondary | Primary | Secondary | Primary | Secondary | |
| A | 2.5 | 2.5 | 15.11 | 18.9 | 73.6 | 42.6 | 23 |
| B | 2.58 | 2.78 | 14.09 | 15.52 | 58.6 | 32.6 | 23 |
| C | 3.59 | 3.0 | 15.7 | 14.5 | 27.8 | 34.2 | 26 |

The oriented film from blend B above was found to have a water vapor transmission of 0.062 gms./100 in.$^2$/atm./24 hrs./mil.

All of the foregoing blends have molecular weights based on viscosity measurements in excess of 70,000 and thus they are within the scope of the present invention. It is apparent that these blends produce biaxially oriented films which have excellent physical properties and are within the scope of this invention.

Example IV

A copolymer of methacrylonitrile and methyl methacrylate was prepared from a charge of 95 parts of methacrylonitrile and 5 parts of methyl methacrylate in an aqueous emulsion polymerization employing a peroxide initiator and t-dodecyl mercaptan as the modifier. This polymer was found by dilute solution viscosity measurement to have a molecular weight of 120,000.

Films of the foregoing polymer were cast from a 22% by weight solution of the polymer in methyl ethyl ketone. The films were cast 50 mils thick on a smooth glass plate and the resulting film was heated from 38° C. to 60° C. to remove some of the solvent and the resulting film was dried at 60° C. for 48 hours. The resulting film was biaxially oriented in a laboratory orienting device as described in the previous examples. Samples of the dried, unoriented film and the dried, oriented film were tested with the following results:

| Average draw ratio | | Tensile strength $\times 10^{-3}$ | | Percent elongation | |
|---|---|---|---|---|---|
| Primary | Secondary | Primary | Secondary | Primary | Secondary |
| 2.4 | 2.2 | 7.30 | 7.59 | 27.04 | 31.31 |
| Unoriented | | 4.54 | | 7.46 | |

The foregoing data represent the average of 25 samples of oriented film and 5 samples of unoriented film.

Example V

This example will illustrate the formation of a biaxially oriented polyacrylonitrile film from polyacrylonitrile prepared in an aqueous suspension polymerization. The following recipe was charged to a 2 liter, 3-neck flask equipped as in Example I and the polymerization carried out under nitrogen atmosphere with mild agitation at 60° C. for 3 hours.

Material: Parts
Acrylonitrile (inhibitor free) _____ 100
Water (deoxygenated) _____ 200
t-Butyl peroxy pivalate (initiator) _____ 0.1
t-Dodecyl mercaptan _____ 1.0
Polyvinyl alcohol dispersant _____ 0.5

The polymer was obtained as beads, was washed with MeOH, and was dried in a vacuum oven at 60° C. After grinding to a fine powder, a 14% solution of the polymer was made in 90/10 DMF/ethylene carbonate and the solution was filtered and cast on glass plates with a 50 mil doctor blade. Setting of these films was accomplished in a forced air oven at 60–65° C. for 1 hour. Orientation was accomplished on the solvent swollen films as described in Example I and data obtained from these oriented films are shown below. The data represent the average properties determined on 36 specimens, 18 in each direction.

Average draw ratio:
    Primary ........................................ 2.09
    Secondary ...................................... 2.79
Tensile strength $\times 10^{-3}$ p.s.i.:
    Primary ........................................ 16.72
    Secondary ...................................... 15.13
Percent elongation:
    Primary ........................................ 69.7
    Secondary ...................................... 31.5

The above oriented film was found to have a water vapor transmission of 0.019 gms./100 in.$^2$/atm./24 hrs./mil. The density of the dried cast film was substantially the same as that of the oriented and heat set film prepared in the foregoing manner.

Example VI

Polyacrylonitrile having a molecular weight of 130,000 as determined by dilute solution viscosity was prepared at 140° F. using the following ingredients and the procedure given in Example I:

|   | Parts |
|---|---|
| Acrylonitrile | 100 |
| Water | 200 |
| Azobisisobutyronitrile | 0.5 |
| t-Dodecyl mercaptan | 1.2 |
| Polyvinyl pyrrolidone | 0.25 |

The polymerization time was six hours. The resulting slurry was separated by centrifugation, washed thoroughly with water and dried at 70° C. at reduced pressure.

A solution of the foregoing polymer was prepared by dissolving 15.5% by weight of polymer in a solvent composed of a 9:1 weight ratio of dimethyl formamide: ethylene carbonate. The solution was accomplished by agitation of the mixer with a high shear disc mixer at a temperature of 160° F.

A film was formed by casting the foregoing solution onto an endless stainless steel belt in a roll-coating apparatus. The solution was deposited in a thickness of about 22 mils and the resulting deposit was dried to a 49% solids film in a multi-stage oven employing temperatures of from 100 to 200° F. in four heating zones.

The film from above was stretched longitudinally so that a length increase of 2.5 to 1 was achieved using a four roll drafting apparatus having two hot rolls (162° F.) and two cold rolls (60–65° F.). The output speed of this apparatus was 160 feet per minute. The monoaxially oriented film produced in this way contained about 50% by weight of solvent.

The monoaxially oriented film described above was next stretched in a lateral direction in a conventional parallel chain tentering apparatus at a stretch ratio of 2.5 to 1 at a temperature of 205° F. The biaxially oriented film thus obtained contained about 25–30% by weight of solvent. The solvent-containing biaxially oriented film was dried while restrained in a dimensionally stable condition at a temperature of from 230 to 435° F. for a total period of about 1 minute. The dried film contained less than 1% by weight of solvent and it was found to have tensile strengths in the order of 20,000 p.s.i. in each direction of orientation as well as excellent barrier properties for vapors and gases.

I claim:
1. The process for preparing a biaxially oriented polymer film comprising
    (1) forming a solution consisting essentially of a polymer having a minimum apparent molecular weight of about 70,000 composed of at least one alpha, beta-olefinically unsaturated nitrile monomer having from 3 to 4 carbon atoms and a terminal $CH_2$=C< group and up to 15% by weight of one or more polymerizable monoalkenyl monomers copolymerizable therewith in a volatile polar organic solvent,
    (2) forming a film containing from 8 to 70% by weight of solvent from said solution,
    (3) stretching the resulting film at a temperature of from 100 to 260° F. in a longitudinal and a transverse direction so that the film then contains at least about one-half the weight of polar solvent that it contained after (2) and then
    (4) drying the film at a temperature of from about 125 to 250° C. for up to about five minutes while it is retained in its biaxially stretched condition.
2. The process of claim 1 wherein the film forming in (2) is accomplished by casting the solution on a smooth surface.
3. The process of claim 2 wherein the alpha, beta-olefinically unsaturated nitrile is a member selected from the group consisting of acrylonitrile and methacrylonitrile.
4. The process of claim 3 wherein the alpha, beta-olefinically unsaturated nitrile is acrylonitrile.
5. The process of claim 3 wherein the alpha, beta-olefinically unsaturated nitrile is methacrylonitrile.

References Cited

UNITED STATES PATENTS

| 3,275,612 | 9/1966 | Bechtold | 260—88.7 |
| 2,684,348 | 7/1954 | Dietrich et al. | 264—206 |
| 2,786,043 | 3/1957 | Schuller et al. | 264—206 |
| 3,056,170 | 10/1962 | Hendricks et al. | 264—206 |
| 3,084,992 | 4/1963 | Schlack et al. | 264—206 |

DONALD J. ARNOLD, *Primary Examiner.*

U.S. Cl. X.R.

264—210, 216, 289, 182